UNITED STATES PATENT OFFICE.

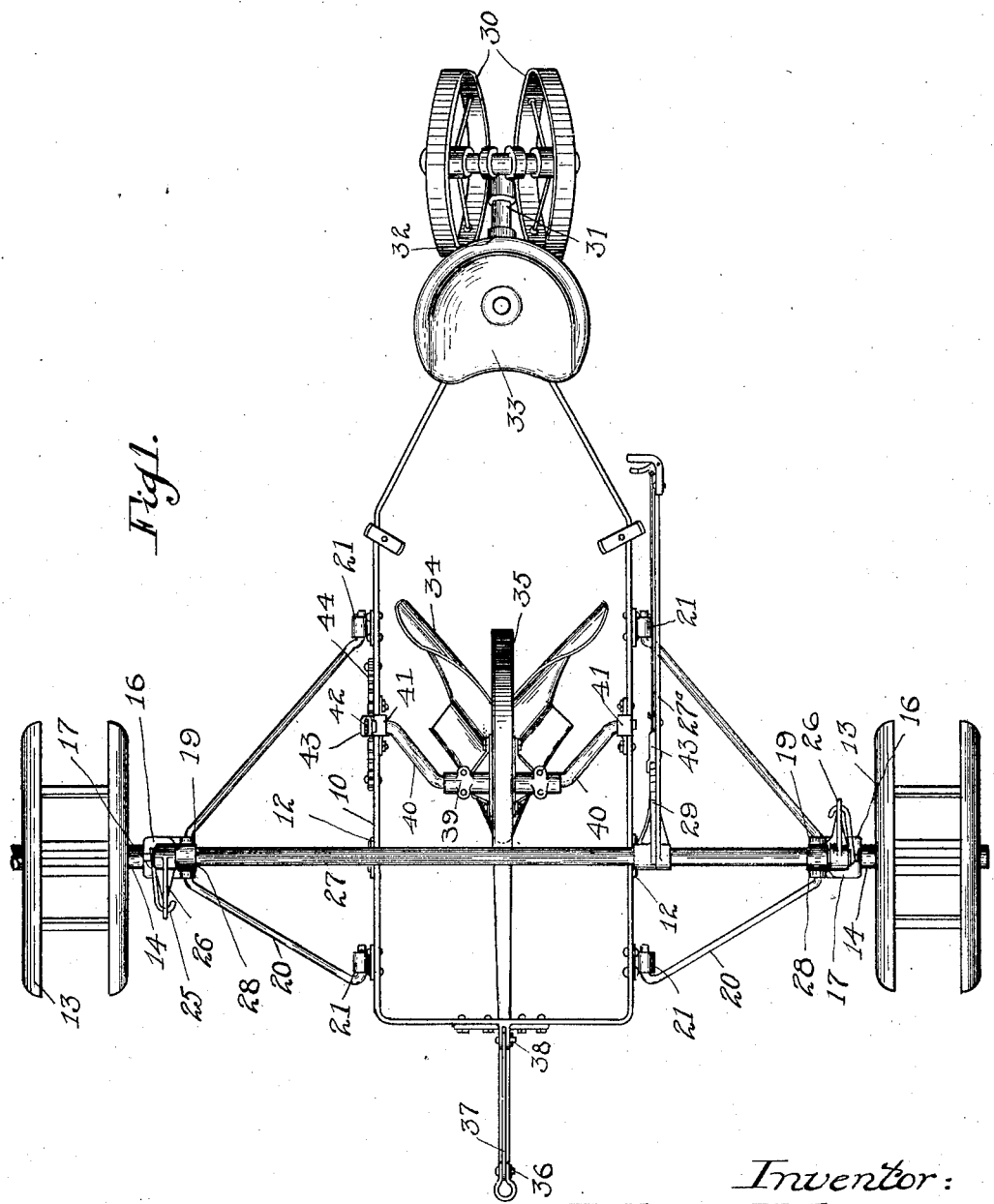

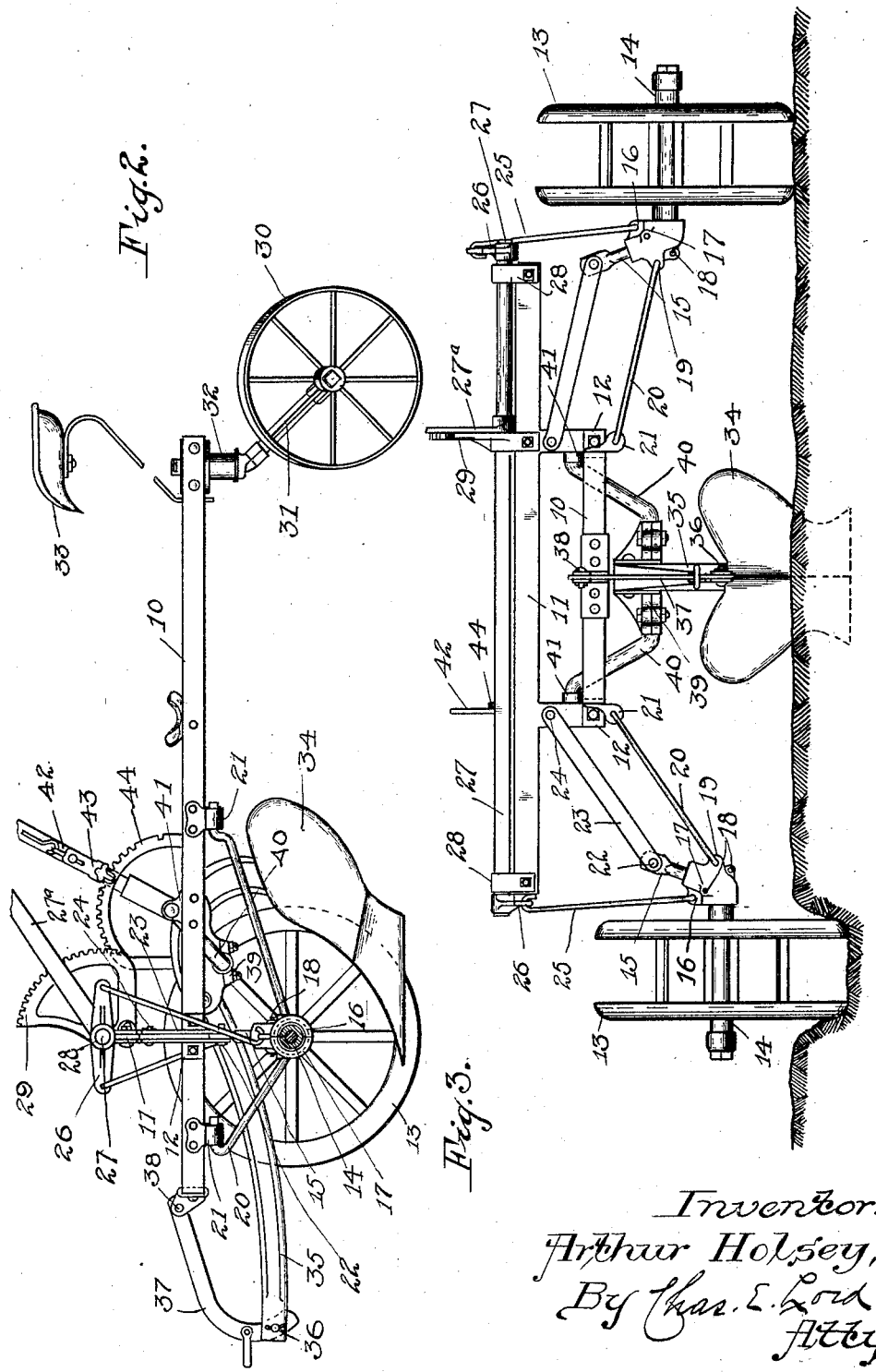

ARTHUR HOLSEY, OF CHICAGO, ILLINOIS, ASSIGNOR TO INTERNATIONAL HARVESTER COMPANY, A CORPORATION OF NEW JERSEY.

LISTER-PLOW.

1,362,795.   Specification of Letters Patent.   Patented Dec. 21, 1920.

Application filed June 26, 1919. Serial No. 306,968.

*To all whom it may concern:*

Be it known that I, ARTHUR HOLSEY, a citizen of the United States, residing at Chicago, in the county of Cook and State of Illinois, have invented certain new and useful Improvements in Lister-Plows, of which the following is a full, clear, and exact specification.

This invention relates to lister plows.

In plows of this character when in use one of the forward wheels of the plow runs in a furrow made on the previous round and acts as a spacer for the furrow which is being made. The other forward wheel of the plow runs upon the land, and it is necessary that provision be made for leveling the plow due to the unequal levels on which the two forward wheels run.

It is an object of this invention to provide a better means for connecting the ground wheels to the frame, and particularly so that the axles of these wheels will move substantially parallel to themselves and to the frame.

Another object is to provide a lister plow of a strong but light construction which will be economical to build and to maintain.

These and other objects, as will appear from the following specification are accomplished by my invention which comprises a lister plow having a frame, stub axles connected thereto for motion in a vertical plane, ground wheels on said stub axles and means for raising and lowering said stub axles relative to the frame.

Reference is now had to the drawings in which—

Figure 1 is a plan view of my lister plow;

Fig. 2 is a side elevation of the same with the left front wheel removed and with the plow base in the raised position;

Fig. 3 is a front elevation of the same, showing my plow in plowing position.

My invention is embodied in a plow having a main frame 10, to which is attached a transverse member 11 by means of clips 12, or any other suitable means. The frame is supported upon the forward wheels 13 which are journaled upon stub axles 14, having bent extensions 15. The bend of each of these stub axles is clamped by two bracket members 16 and 17 which are secured together by means of bolts 18. The bracket member 17 has hingedly connected thereto through the ear 19 the angle of a V-shaped brace member 20, which in turn has its arms pivotally connected to the frame 10 by means of lugs 21. The extension 15 of the stub axle has pivotally secured thereto at 22 a link 23, the other end of which is hingedly fastened at 24 to a part of the transverse member 11. The link 23 and the brace 20 I prefer to make of substantially the same effective length and to hinge these members at points which are in substantially the same vertical plane. By this arrangement it will be understood that as the axle 14 is raised and lowered its motion always will be substantially parallel to itself and to the frame of the lister plow.

The bracket member 16 has an ear in which is pivotally mounted one end of the adjusting rod 25. The other end of this rod is pivotally connected to a crank 26, one of which is placed upon each end of the leveling shaft 27. This shaft is journaled in bearings 28 which are carried by the transverse member 11, and this shaft is operated by means of a lever 27ª which has a hand-operated means for locking it to the quadrant 29, which is also carried by the transverse member 11.

The rear end of the main frame is preferably supported by angled wheels 30 which are mounted upon a trailing axle member 31, which is journaled in the caster bearing 32. A seat 33 is also mounted at the rear of the frame for convenience of the driver.

The plow base may be carried by the frame in any suitable manner, but I have preferably shown the plow base 34 carried by the plow beam 35, which is hingedly supported at its forward end at 36 on a link 37 which is pivotally secured at 38 to the main frame 10. The rear end of the plow beam is pivotally supported at 39 by a crank shaft 40, the ends of which are journaled in bearings 41 which are carried by the main frame. A hand-operated lever 42 is connected to the crank 40 for raising and lowering the plow. This lever is held in an adjusted position by a detent 43 acting upon a quadrant 44 which is secured to the main frame 10.

In operation, one wheel 13 runs in a previously made furrow, as shown in Fig. 3, while the main frame carrying the plow base is rocked to a level position by the operating lever 27ª which depresses the one wheel which we may call the furrow wheel, and raises the other which we may call the land wheel. Owing to the arrangement of the parallel links by which the axles are carried by the frame, the motion of these axles, together with the wheels always maintain the axles parallel to themselves and to the frame at all possible positions. In this way there is no tendency for the plow to run to one side or the other due to the tilting action of the wheels when they are operating upon different levels.

While I have shown and described but a single embodiment of my invention, it is to be understood that it is capable of many modifications. Changes, therefore, in the construction and arrangement of parts may be made which do not depart from the spirit and scope of my invention as disclosed in the appended claims.

1. In a lister plow, a frame, stub axles connected thereto by parallel link motions so as to maintain said axles in parallelism, wheels on said stub axles and means for raising and lowering said axles with respect to the frame.

2. In a lister plow, a frame, stub axles connected thereto by parallel link motions so as to maintain said axles in parallelism, wheels on said stub axles and means for reversely and simultaneously raising and lowering said axles with respect to the frame.

3. In a lister plow, a frame, stub axles connected thereto by parallel link motions so as to maintain said axles in parallelism, wheels on said stub axles and a shaft on said frame, reversely angled cranks on said shaft and links connecting said cranks to said stub axles.

4. In a lister plow, a frame, stub axles connected thereto by members hinged to both at points lying in substantially the same vertical planes, each pair of said members lying in substantially parallel planes and means for raising and lowering said axles.

5. In a lister plow, a frame, stub axles connected thereto by members hinged to both at points lying in substantially the same vertical planes, each pair of said members lying in substantially parallel planes and means for reversely and simultaneously raising and lowering said axles.

6. In a lister plow, a frame, stub axles connected thereto by members hinged to both at pivots lying in substantially the same vertical planes, each pair of said members lying in substantially parallel planes and one of said members being branched and connected to the frame at longitudinally spaced points, and means for vertically adjusting the axles and links relatively to the frame.

7. In a lister plow, a frame, a stub axle provided with an upward extension at its inner ends, a link pivotally connecting the end of said extension with the frame, a second link connected to the lower portion of said extension and having diverging arms pivotally connected to the frame and means on the frame for vertically adjusting the axle and links relatively thereto.

In testimony whereof I affix my signature.

ARTHUR HOLSEY.